(12) United States Patent
Uberti

(10) Patent No.: US 10,902,681 B2
(45) Date of Patent: Jan. 26, 2021

(54) METHOD AND SYSTEM FOR DISPLAYING A VIRTUAL OBJECT

(71) Applicant: Sony Interactive Entertainment Inc., Tokyo (JP)

(72) Inventor: David Erwan Damien Uberti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/432,003

(22) Filed: Jun. 5, 2019

(65) Prior Publication Data
US 2019/0392642 A1    Dec. 26, 2019

(30) Foreign Application Priority Data

Jun. 22, 2018 (GB) .................................. 1810270.7

(51) Int. Cl.
| | |
|---|---|
| *G09G 5/00* | (2006.01) |
| *G06T 19/00* | (2011.01) |
| *G06T 7/50* | (2017.01) |
| *G06T 7/70* | (2017.01) |
| *G06F 3/01* | (2006.01) |

(Continued)

(52) U.S. Cl.
CPC ............ *G06T 19/006* (2013.01); *G06F 3/013* (2013.01); *G06T 7/20* (2013.01); *G06T 7/50* (2017.01);

(Continued)

(58) Field of Classification Search
CPC .................................................. G06T 19/006
See application file for complete search history.

(56) References Cited

U.S. PATENT DOCUMENTS

| | | | | |
|---|---|---|---|---|
| 2012/0092328 A1* | 4/2012 | Flaks | ...................... | G06F 3/012 |
| | | | | 345/419 |
| 2014/0064557 A1* | 3/2014 | Hara | ...................... | G06F 3/012 |
| | | | | 382/103 |

(Continued)

FOREIGN PATENT DOCUMENTS

WO      2014144526 A2     9/2014

OTHER PUBLICATIONS

European Search Report for corresponding EP Application EP19176447, 8 pages, dated Aug. 6, 2019.

(Continued)

*Primary Examiner* — Charles Tseng
(74) *Attorney, Agent, or Firm* — Matthew B. Dernier, Esq.

(57) ABSTRACT

A system for displaying a virtual object includes a display device for displaying an environment; a video camera, where the video camera is operable to capture a video image of an area of a user's environment, the size of the area in the video image being larger than the size of the area of the environment viewable at the display device; a motion predictor operable to predict a motion of the camera; a scene processor operable to identify and process a portion of the captured video image that corresponds to an area of the environment that is expected to be made viewable at the display device, as a result of the predicted motion; an image generator configured to receive an input from the scene processor, and in response thereto, generate a virtual object for display at the display device; and where the image generator is configured to output the virtual object for display in response to a detection of the predicted motion.

14 Claims, 6 Drawing Sheets

(51) Int. Cl.
- *G06T 7/20* (2017.01)
- *G06T 13/20* (2011.01)
- *G06T 15/20* (2011.01)
- *G06T 15/50* (2011.01)
- *H04N 5/247* (2006.01)

(52) U.S. Cl.
CPC ............. *G06T 7/70* (2017.01); *G06T 13/20* (2013.01); *G06T 15/20* (2013.01); *G06T 15/50* (2013.01); *G06T 2207/10016* (2013.01); *G06T 2207/20081* (2013.01); *G06T 2207/30244* (2013.01); *H04N 5/247* (2013.01)

(56) References Cited

U.S. PATENT DOCUMENTS

| | | | |
|---|---|---|---|
| 2014/0125668 A1 | 5/2014 | Steed | |
| 2014/0267420 A1* | 9/2014 | Schowengerdt | G02B 27/0093 345/633 |
| 2017/0061693 A1* | 3/2017 | Kohler | G06T 19/00 |
| 2017/0206712 A1 | 7/2017 | Petrovskaya | |
| 2017/0213388 A1 | 7/2017 | Margolis | |
| 2018/0005393 A1* | 1/2018 | Senthamil | G06T 7/80 |
| 2018/0012411 A1* | 1/2018 | Richey | G06T 19/006 |
| 2018/0322680 A1* | 11/2018 | McElmurray | G06K 9/00255 |

OTHER PUBLICATIONS

Anonymous: "Predictive tracking—Virtual Reality and Augmented Reality," Retrieved from the Internet: URL:https:jjxinreality.comjmediawiki/index .php?title=Predictive tracking&oldid=22048, 6 pages, May 22, 2017.

Fakhr-Eddine Ababsa et al: "Head Motion Prediction in Augmented Reality Systems Using Monte Carlo Particle Filters," Retrieved from the Internet:URL:http:jjgsc11.cemif.univ-evry.frjpublicjpresentation/ABA03cC.pdf, 6 pages, Dec. 3 2003.

Search report for corresponding PCT Application GB1810270.7, 1 pages, dated Dec. 7, 2019.

* cited by examiner

METHOD AND SYSTEM FOR DISPLAYING A VIRTUAL OBJECT

BACKGROUND OF THE INVENTION

Technical Field

The present disclosure relates to a method and system for displaying a virtual object.

Description of the Prior Art

Many display devices enable users to experience an augmented reality. Typically, these devices are in the form of a smartphone or a head-mountable display (HMD) and employ a camera for capturing a live-view of the user's physical, real-world environment. By superimposing virtual objects over this view, the user is able to experience a reality in which those virtual objects appear to be present in the user's real-world environment.

More recently, augmented reality has been taken one step further into the form of so-called 'mixed reality'. Mixed reality differs from augmented reality in that the physical boundaries or surfaces of the user's physical environment are taken into account when displaying virtual objects in that environment. For example, instead of a virtual object simply being overlaid on top of the user's view, the virtual object may appear as to be resting on a real-world physical surface, and with a depth that corresponds to the position of that surface, in the real-world environment.

In some versions of mixed reality, the user's view of the real world may be entirely obscured by the view of a virtual reality, but the virtual reality itself may include representations of one or more physical boundaries or surfaces within the real-world environment.

Generally, when displaying virtual objects in an augmented or mixed reality, the realism with which those objects appear will depend on various aspects of the user's real-world environment. These may include for example, the lighting conditions of the real-world environment, the presence of any (real) physical objects, surfaces, or boundaries. As the user's view of the environment changes, these aspects of the environment may also change and therefore need to be taken into account when rendering virtual objects.

In known systems, detecting changes in a user's viewpoint of an environment usually requires the processing of video images in real-time. This can be somewhat intensive in terms of the processing required. Often, there is a lag between the detecting of the changes and the rendering of a virtual object that takes those changes into account. This lag may manifest in the display of a virtual object that appears out of sync with the real-world environment. For example, the virtual object may be displayed with the wrong lighting, or may appear with the wrong depth relative to other objects that have come into the user's view. Overall, this can break the immersion of the user's experience, leading to sub-optimal experience for the user.

The present invention seeks to mitigate or at least alleviate these problems.

SUMMARY OF THE INVENTION

According to a first aspect disclosed herein, there is provided a system in accordance with claim 1.

According to a second aspect disclosed herein, there is provided a method of displaying a virtual object in accordance with claim 13.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
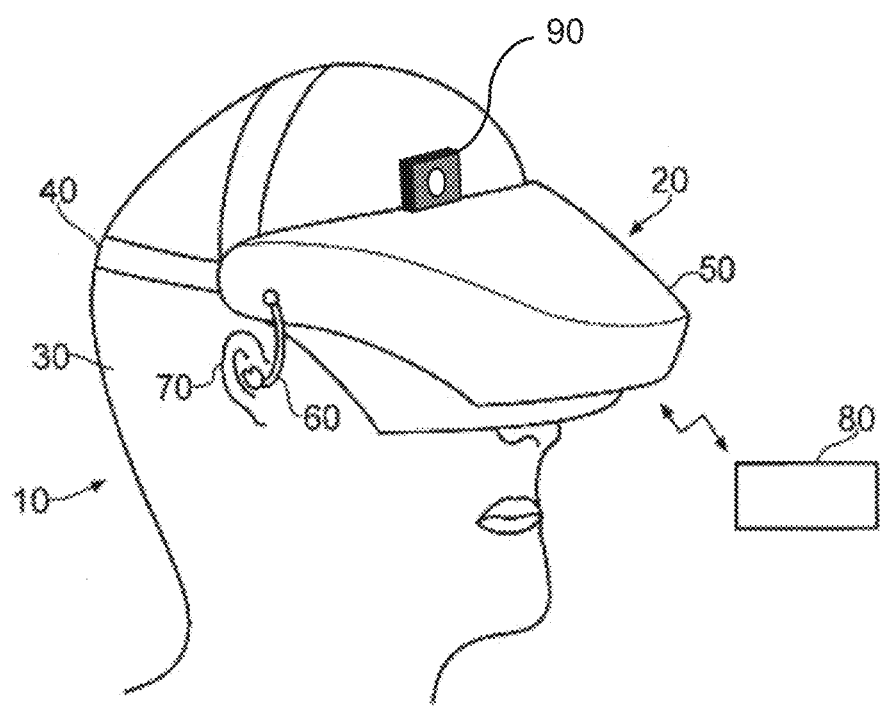
FIG. 1 shows schematically shows an example of a HMD in accordance with the present invention.

Referring now to the drawings, wherein like reference numerals designate identical or corresponding parts throughout the several views, FIG. 1 schematically shows an example of a display device 20 in accordance with the present invention.

In FIG. 1, the display device 20 is shown as a head-mountable display (HMD) being worn on a user' head 30. The HMD comprises a strap 40 for securing the HMD to the user's head and a display portion 50 for displaying an image to the user. The image may correspond to a virtual object or virtual environment, for example.

In FIG. 1, the display portion 50 is shown as entirely obscuring the user's view of the surrounding environment. In this example, the user may be limited to seeing the pair of images displayed within the HMD (at the display portion 50). In other examples, the user's view of the external environment may not be entirely obscured by the display portion 50. For example, the images may be arranged so as to be superposed (from the user's point of view) over the external environment. This may result in the user experiencing an 'augmented' reality, as opposed to a strictly virtual reality.

In FIG. 1, the frame 40 is shown as comprising a rear strap and a top strap. In other examples, the frame 40 may be more akin to that associated with conventional eyeglasses. For example, the frame 40 may have a substantially horizontal leg extending back from the display portion 50 to the top rear of the user's ear, possibly curling down behind the ear. This may be the case where, for example, the user is able to view at least some of the external environment, through the display portion 50. In other words, where the display portion 50 comprises a transparent or partially transparent surface onto which an image is projected.

In some examples, the HMD may be in communication with a separate computing device. The separate computing device may act as a video signal source, and may be configured to transmit the video signals to the HMD. In these examples, the HMD may be configured to receive and display the video signals from the separate video signal source. The external video signal source may be, for example, a games console. In other examples, the HMD may be operable to generate the images for display, without receiving them from a separate computing device.

In FIG. 1, the HMD is also shown as comprising headphone earpieces 60 which fit into the user's left and right ears 70. The earpieces 60 replay an audio signal provided from an internal or external source. For example, the HMD may be in communication with another computing device, such as a games console, and the earpieces may be configured to output the audio signals received from the games console. In other examples, the HMD itself may be configured to generate the audio signals, without receiving them from an external source of audio signals. In some examples, the HMD may include one or more microphones (not shown) for capturing audio signals.

The HMD shown in FIG. 1 is also shown as comprising a video camera 90. In FIG. 1, the video camera 90 is shown as being mounted to the HMD and being located above the user's eyes and (approximately) at the centre of the user's forehead. In some examples, the video camera 90 may be integrally formed with the HMD, with the lens of the video camera 90 being exposed at an outer surface of the HMD. Generally, the video camera 90 is positioned so as to capture an area of the environment that includes, and is greater than, the extent of the environment that would otherwise fall within the user's field of view.

The video image captured by the video camera 90 may be displayed at the display portion 50. For example, the user's view of the external environment may correspond to the captured video image of the environment. This may be the case, for example, where the user's view of the environment is entirely obscured by the display portion 50. In other examples, the user may be able to view the environment through display element (by virtue of its transparency), and the captured video image need not be displayed at the display portion 50. The use of the video image (in both examples) will be described later, in relation to FIGS. 3A and 3B.

In some examples, the HMD may comprise two video cameras. In these examples, each video camera 90 is arranged so as to capture a different area of the environment. That is, each camera 90 may be positioned on or in the HMD, so that a different area of the environment falls within each video camera 90's field of view. One of the video cameras may be located at a central position on or in the HMD, so as to capture a video image that covers the visual field of the user. The other video camera 90 (not shown) may be located to the side of the first video camera 90, so as to capture an area of the environment not yet within the user's field of view. In some examples, the two cameras may be arranged so as to provide a 360 degree (in the horizontal and/or vertical) view of the external environment.

Figure 2:
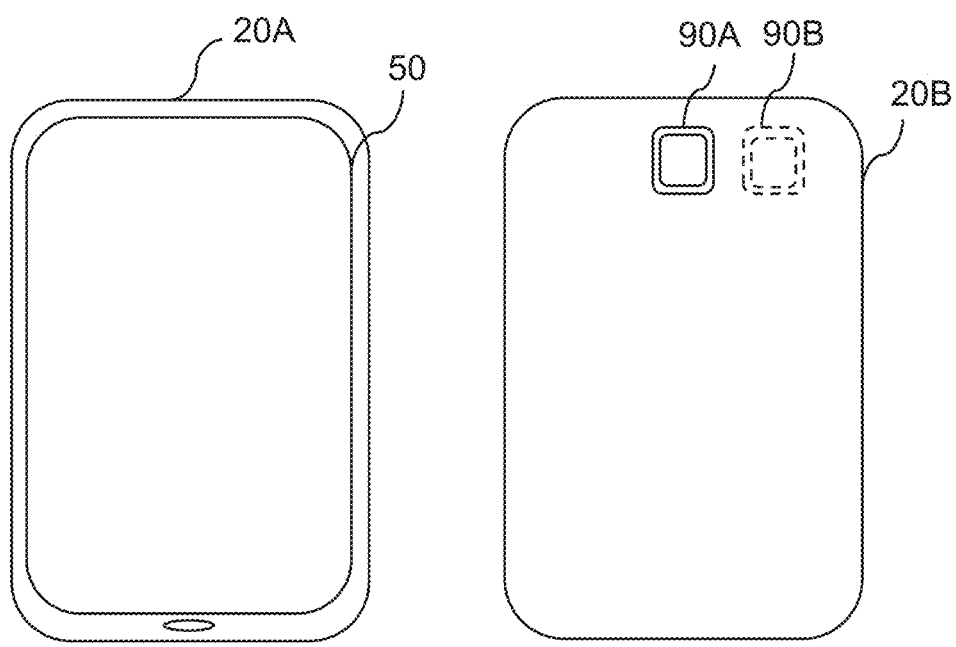
FIG. 2 shows schematically shows an example of a mobile device in accordance with the present invention.

FIG. 2 shows schematically a second example of a display device 20 in accordance with the present invention. In FIG. 2, the display device comprises a mobile device, in the form of a smartphone. The smartphone is shown as being formed of a front surface 20A and a rear surface 20B. The front surface 20A comprises a display portion 50 in the form of a screen; the rear surface comprises at least one video camera 90A for capturing a video image. In the example shown, the video camera 90A is shown as being embedded within the rear surface of the mobile device, located towards the top and centre of the rear surface.

As described previously, the video camera 90A is configured to capture a video image of an area of the environment that is within the video camera's field of view. The mobile device may be configured to display the video image captured by the video camera, at the screen of the mobile device. This may be the case where, for example, an augmented reality image is to be displayed at the mobile device. The video image may be used to provide a view of the user's environment, with one or more virtual objects being overlaid on top of (or within, depending on any occlusion of those objects) that view. It will be appreciated that the video camera 90A may be located elsewhere at the rear surface of the mobile device.

In some embodiments, the mobile device may include a second video camera 90B, for capturing a video image of a different area of the environment. As can be seen in FIG. 2, the second video camera is located to the right of the first video camera 90A, but otherwise aligned with the first video camera 90A at its topmost and bottommost edges. Generally, the second video camera 90B is arranged so as to capture a video image of an area of the environment that is not (currently) viewable at the screen of the mobile device.

It will be appreciated that a different arrangement of video cameras 90A, 90B to those shown in FIG. 2 may be employed by the present invention. Generally, at least one of the video cameras is positioned so as to correspond with a user's view of the external environment, and the other positioned so as to capture an adjacent view of the of the environment. In some examples, the field of view of each video camera may partially overlap.

Figure 3A:
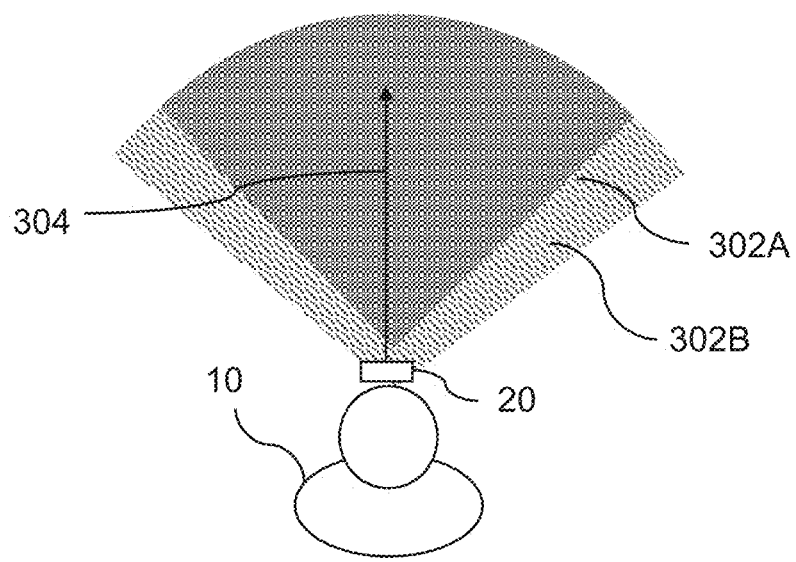
FIG. 3A shows schematically a display device that employs a single video camera.

FIG. 3A shows schematically a top down view of a display device 20 and a field of view of a video camera (not shown) employed by the display device 20.

In FIG. 3A, the display device 20 is shown as being pointed in a direction 34. The display device 20 may correspond to an HMD or a mobile device, as described previously. The field of view of the video camera employed by the display device 20 is shown as comprising two portions. The first portion 302A corresponds to an area of the environment viewable at (or through)/presented by the display portion 50 of the display device 20. The second, peripheral portion 302B corresponds to an area of the environment not viewable at (or through)/presented by the display device 20. It can thus be seen that, in FIG. 3A, the total size of the area captured in the video image is larger than the size of the area viewable at (or through)/presented by the display device 20.

Figure 3B:
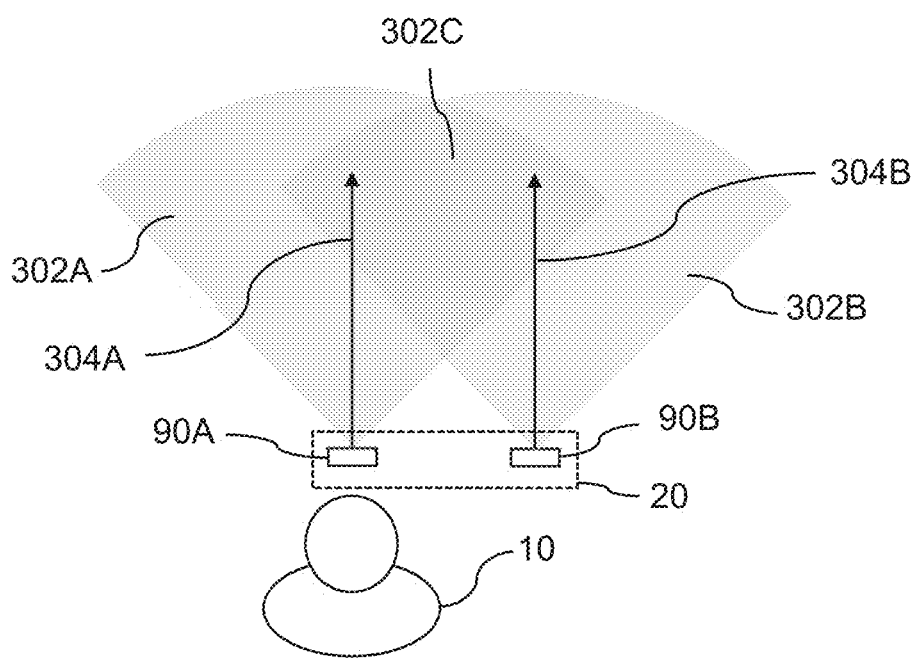
FIG. 3B shows schematically a display device that employs two video cameras.

FIG. 3B shows schematically a top down view of a display device 20 that employs two video cameras 90A, 90B. The first video camera 90A is shown with a field of view 302A; the second video camera 90B is shown with a field of view 302B. Field of view 302B is offset from field of view 302A, and optionally may also be wider (not shown in FIG. 3B). The display device 20 may correspond to the HMD or mobile device described previously.

As can be seen in FIG. 3B, each video camera 90A, 90B is arranged so as to capture a different area of the environment (which may nevertheless overlap, but have a different extent in at least one direction). The area captured by the first video camera 90A may correspond to the area of the environment viewable at/presented by the display device 20. The area captured by the second video camera 90B may correspond at least in part to an area of the environment that is not viewable at the display device 20. The combination of video images covers an area of the environment that is larger than the area of the environment viewable at/presented by the display device 20.

In FIG. 3B the video cameras 90A, 90B are shown as being located at opposite ends of the display device 20. This is to emphasize the different fields of view 302A, 302B of the two video cameras 90A, 90B. It will be appreciated that in reality, one of the video cameras may be located at a central position within (or on) the display device 20 (as shown in FIGS. 1 and 2), and the other video camera 90B located at either side of first video camera 90A. In some examples, the video cameras 90A, 90B are positioned within (or on) the display device 20 such that the video images captured by each camera can be stitched together to form a panoramic image.

In the example of FIG. 3B, rotation of the display device 20 in the clockwise direction may correspond to moving the first video camera 90A to point at an area of the environment previously only captured by the second video camera 90B, prior to the rotation. Similarly, translation of the display device 20 from the e.g. left to right direction may correspond to moving the first video camera 90A so as to include more of the area of the environment previously only captured by the second video camera 90B, prior to the translation. Generally, it is desirable if these kinds of motion can be predicted, as will become apparent from the embodiments described later.

However, in this example, if the rotation of the display device 20 is in the anti-clockwise direction or translates in a right-to left direction, the first video camera moves into an area that may not be previously covered by the second camera.

To accommodate this scenario, optionally the second camera may have a wider field of view than the first camera such that it also captures areas to the left/anticlockwise of the first cameras FOV, or alternatively or in addition, the area of the environment viewable at/presented by the display device 20 corresponds to the area of overlap between the two cameras 302C, so that both cameras are operable to image an area of the environment that is not viewable at/presented by the display device 20, and provide coverage on either side of the currently observed scene.

It will also be appreciated that video camera 90A and optionally video camera 90B may have a field of view that extends vertically above and/or below the area of the environment viewable at/presented by the display device 20, so that the principles disclosed herein can be applied vertically as well as horizontally, either separately or in combination.

It will also be understood that as appropriate the term 'video image' in the singular may encompass the two video images from two cameras, which between them provide a contiguous and typically overlapping view of an environment.

In FIG. 3B, the first and second video cameras 90A, 90B are shown as being pointed in directions 34A and 34B respectively. In FIG. 3B, both video cameras 90A, 90B are shown as being pointed in the same direction. However, in some examples, the cameras may be pointed in different directions (depending on e.g. the field of view of each camera, and the extent of the environment that is to be captured by the video cameras).

Figure 4:
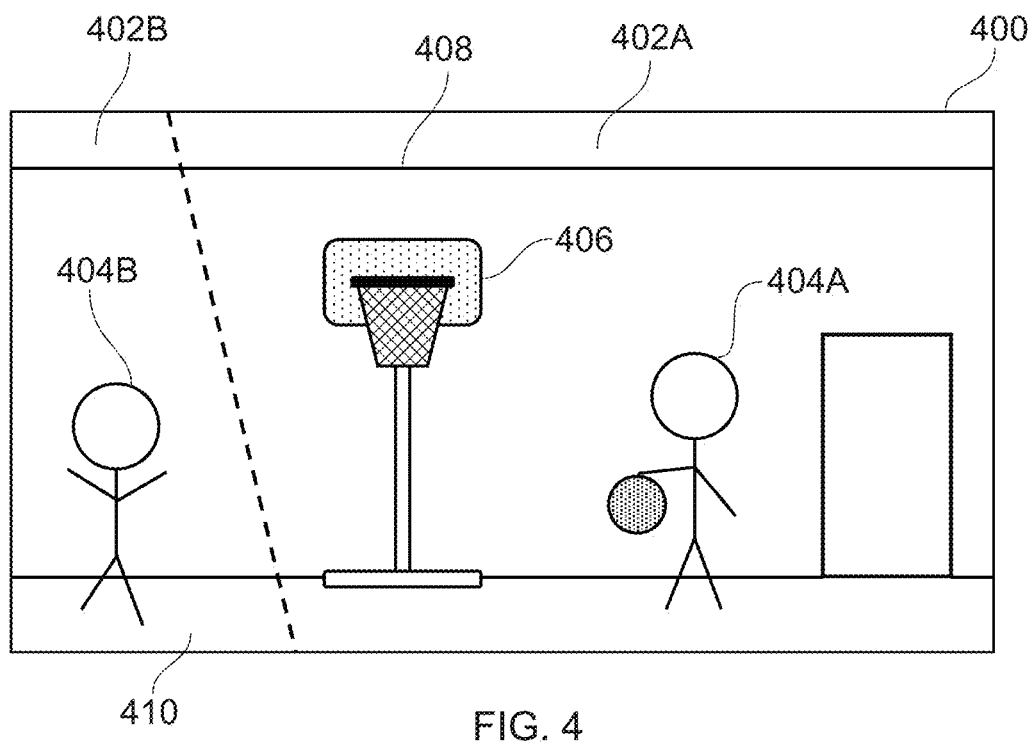
FIG. 4 shows schematically an example of an image captured by the display device of the present invention.

FIG. 4 schematically shows an example of a video image 400 captured by the camera(s) of the display device 20 of the present invention. The image 400 is shown as being formed of two regions, a first region 402A and a second region 402B. The first region 402A may correspond to the part of the environment that is viewable at/presented by the display device 20. The second region 402B may correspond to a part of the environment that is not viewable at the display device 20, but is within the field of view of a video camera employed by the display device 20. If two video cameras are used, the second portion 402B may correspond to the part of the environment that is within the field of view of the second video camera 90B.

In FIG. 4, the video image 400 depicts a scene in which two players 404A, 404B are playing basketball. A basketball hoop 406 is shown, as well as a wall 408 delimiting the area in which the two players are playing basketball. The two players are shown playing on a basketball court, the floor/ground of which is represented by physical surface 410.

In the first portion 402A of the image 400, the first player 404A and the basketball hoop 406 is shown. In the second portion 402B of the image 400, the second player 404B is shown calling to have the ball passed to them. In this scenario, it may be expected that the user 10 will move their display device 20, such that the second player 404B falls within the user's field of view. This may correspond to moving the display device 20 such that the second player 404B occupies a more central position in the captured video image 400. The motion may correspond to, for example, a rotation and/or translation of the display device 20 as a result of the user e.g. rotating and/or moving their head whilst wearing an HMD, or reorienting/repositioning a mobile device.

Figure 5:
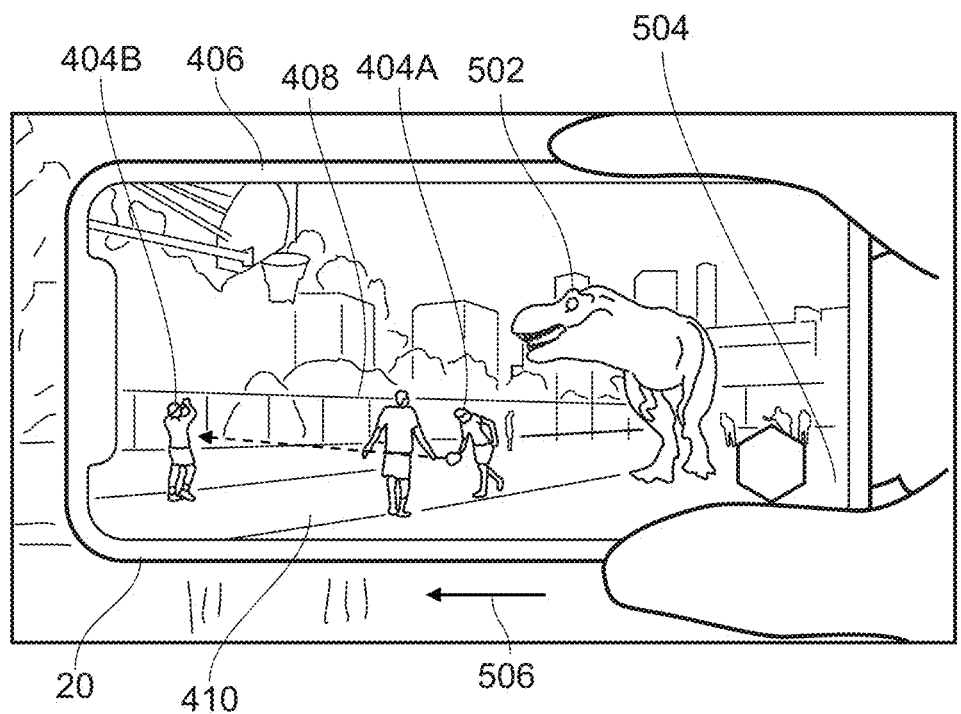
FIG. 5 shows schematically an example of an augmented reality image.

FIG. 5 shows an example of a similar scene to that in FIG. 4, in which a virtual object 502, in this case, a tyrannosaurus rex (T-Rex), is shown as being present in a user's physical, real-world environment. In FIG. 5, the display device 20 is shown as a smartphone and the user's view of the environment is defined by the video image displayed at the smartphone.

In order for the T-Rex to convincingly appear in the user's view of the real world environment, a number of factors may need to be considered before the virtual object 502 is rendered for display. Firstly, the physical surface on which the players are playing will need to be detected, to ensure that the T-Rex is depicted as walking on this surface. This may also need to be detected in order to ensure that a virtual shadow 504 of the virtual object is displayed correctly. Similarly, any physical boundaries, such as walls or fences may need to be detected, to ensure that the T-Rex remains within these boundaries, or interacts with them appropriately. In FIG. 5, a physical boundary 408 in the form of a fence is shown.

In some examples, the presence of one or more physical objects in the environment may also need to be detected. This may involve, for example, detecting a relative position and depth (distance) of the one or more players, the basketball and the basketball hoop in the scene. By detecting both the relative position and depth of these objects, the T-Rex can appear as being occluded by an object, if that object is located in front of the T-Rex (from the user's viewpoint). This may also allow the T-Rex to be animated so as to interact with those objects. For example, the T-Rex may be animated so as to eat one of the players, and so that player may need to be digitally removed from the scene.

In some examples, detecting the physical objects may involve recognising the physical objects as corresponding to predetermined (i.e. known) objects. This may involve, for example, recognising that a physical object corresponds to a basketball hoop. In additional or alternative examples, this may involve distinguishing and/or recognising the identity of individual players, and controlling the actions of the T-Rex so as to be directed at particular player(s). Again, by recognizing certain physical objects, this can be used to control how a virtual object is shown as interacting with them.

In some examples, the lighting conditions within the scene may be determined so that the T-Rex is displayed as if it were subject to those lighting conditions. For example, if the basketball game is being played in the evening, it may be desirable to display the T-Rex being more dimly lit than say, if the basketball game were being played at mid-day. In some cases, the lighting conditions may vary at different locations within the user's environment, and so it may necessary to adjust the lighting that the virtual object is displayed as being exposed to, as the user's view of the environment changes. The lighting conditions may also need to be detected in order to determine how the T-Rex's virtual shadow is to be displayed within the scene.

In additional examples, it may also be desirable to track certain events occurring within the scene. In FIG. 5, this may correspond to tracking when e.g. the basketball goes into the hoop, or when two players collide with one another. By tracking these events, the animation of the virtual object can be controlled so as to react to the detected events.

As can be appreciated, any one of these features of the displayed environment may change, as the displayed view of the environment changes. In known systems, these changes are typically detected as the display device (or rather, the display device's video camera) is moved so as to capture the new or changing features. However, detecting the changes in in this way is problematic. For example, it may not be possible to display the virtual object as reacting to the user's environment in real-time if there are still features of the user's environment that are being detected. If the user moves their display device further, there may be yet more features of the environment that need to be detected. This can result in the virtual object appearing out of sync with the user's environment. Overall, the user may experience a less convincing augmented or mixed reality.

Figure 6:
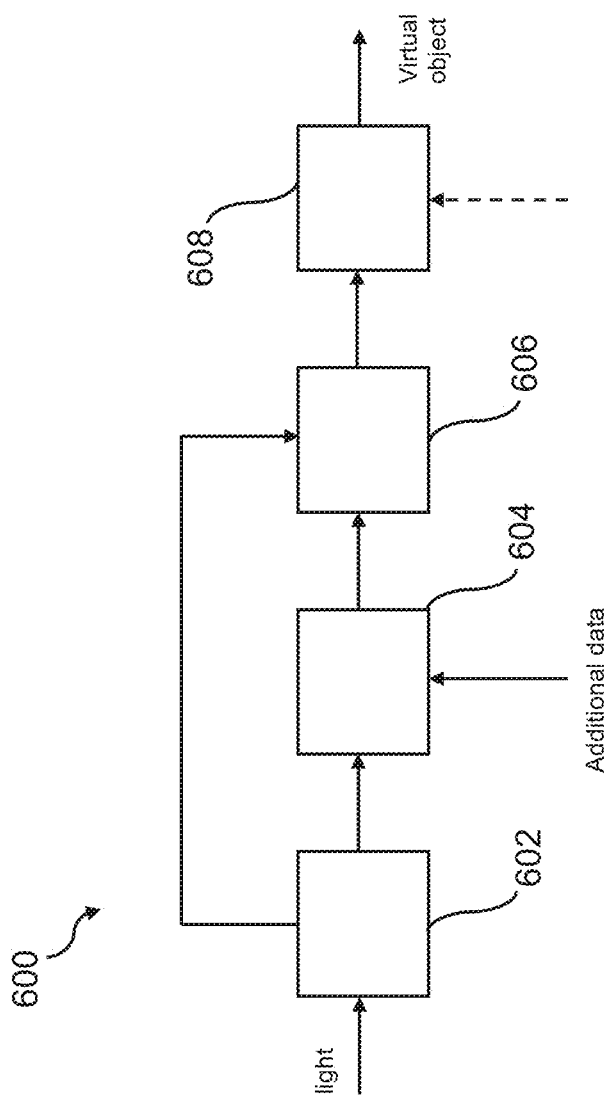
FIG. 6 shows an example of a system in accordance with the present invention.

FIG. 6 schematically shows an example of a system 600 for mitigating or at least alleviating this problem by implementing techniques discussed herein. Such a system is herein referred to as a system in accordance with the present invention. The components shown in FIG. 6 may all be components of the display device 20 discussed previously. In other embodiments, at least some of the components may be implemented at a separate computing device, as will be described below.

The system 600 comprises a video camera unit 602 for capturing a video image of an area of the user's external environment. The video camera unit 602 may comprise a single video camera, or two video cameras, as described previously in relation to FIGS. 3A and 3B. The video image (or combination of video images) captured by the video camera unit 602 covers an area of the environment that is larger than the size of the area of the environment viewable at/presented by the display device 20.

The system 600 further comprises one or more processors in the form of a motion predictor 604 configured to predict a motion of the camera(s), for example by predicting motion of the display device 20 as a proxy. The predicted motion of the display device 20 can be used to determine an area of the environment that is likely to be made viewable at the display device 20, as a result of the motion having been performed.

In some examples, the motion predictor 604 may be configured to predict a pose (i.e. position and/or orientation) of the display device 20 based on previous poses of the display device. For example, the display device 20 may comprise a motion detector (not shown) configured to detect a pose of the display device 20. The pose of the display device 20 may be monitored over time, and used to predict a subsequent pose of the display device 20. This may involve, for example, determining a velocity of the display device 20. It should be noted that predicting motion of the display device 20 in this way may be sufficiently reliable over small time frames. For longer time frames, or complex motion that involves e.g. rapid changes in direction, this method of predicting motion may be less accurate. Simple examples of such motion prediction may relate to watching a tennis or football match, or a diving competition, where the direction and extent of motion can be envisaged as predictable.

In additional or alternative examples, the motion predictor 604 may comprise a gaze-direction detector for detecting changes in direction of the user's gaze. The gaze-direction detector may include, for example, an infra-red camera arranged to capture an image of an eye (or eyes) of the user, and the gaze-direction detector may be configured to identify and track the location of the user's pupil(s) within the captured images. The motion predictor 604 may be configured to predict motion of the display device 20 based on a detected change in the user's gaze direction. For example, if the user's pupils are detected as moving e.g. to the left, it may be expected that the user will move the device 20 in a corresponding direction.

In yet additional or alternative examples, the motion predictor 604 may be configured to predict a motion of the display device 20 based on the detection of one or more physical (i.e. real-life) objects in the video image captured by the video camera unit 602. In some examples, this may involve detecting a movement of one or more of the physical objects. For example, it may be expected that the user 10 will move the display device 20 so as to retain the moving object within the user's field of view of the environment. In some examples, this may involve detecting that a physical object is performing a movement or an action that is likely to cause the user 10 to turn (or turn their device 20) to that object. The object may for example be a particular person, or a ball, or an object having a significant brightness or contrast difference to the overall scene (for example due to being in a spotlight).

The motion predictor 604 may detect so-called 'optical flow', being a gross motion of features within the image due to a panning or rotation of the camera(s).

The motion predictor 604 may employ e.g. computer vision or machine learning in order to detect different physical objects within the video image. Similarly, the motion predictor 604 may employ machine learning for recognizing certain movements within the video image as corresponding to actions that a user is likely to track and/or focus their gaze upon.

In further examples, the motion predictor 604 may be configured to predict motion of the display device 20 based on a location in the environment detected as being associated with a source of audio. For example, it may generally be expected that a user 10 will look at (and in doing so, turn their device to face) a physical object, such as a person speaking. In such a case, the motion predictor 604 may be configured to determine that the display device 20 is likely to be moved (e.g. rotated) in the direction of the detected source of audio. The display device 20 may include, for example, two or more microphones for detecting the direction of the source of audio, relative to the user.

In yet further examples, the motion predictor 604 may be configured to predict motion of the display device 20 based on the location of a virtual object that is, or is to be, displayed at the display device 20. For example, it may be expected that a user 10 will turn the display device 20 towards a virtual object in order to obtain a better view of that virtual object. Thus the motion predictor 604 may be configured to obtain the location of the virtual object within the user's environment, and in response thereto, determine a corresponding motion that the display device 20 is likely to undergo. The location (or last location) may be obtained from a processor (e.g. image generator 608) performing an augmentation of the scene with the virtual object, or may be obtained from image analysis or the like.

In preferred embodiments, a machine learning algorithm is used to predict a motion (or rather, a subsequent pose) of the display device 20.

The machine learning algorithm may be trained with data indicating motion of display devices 20, and corresponding video data captured by the display devices 20, prior to the motion. The training may involve determining a function that maps video data (corresponding to a user's view of the environment) captured by a display device 20 to subsequent motion of the display device 20. The function may be defined in terms of one or more parameters, and these parameters may be adjusted until the function is able to predict motion of the display device 20 with sufficient accuracy. In an example, these parameters may be adjusted using backpropagation—i.e. the output (a predicted motion of the display device 20) of the machine learning algorithm may be compared with the original input (the actual motion of the display device 20), and the parameters may be adjusted until motion of the display device 20 can be predicted with sufficient accuracy. As is known in the art, the algorithm may be said to have been sufficiently trained once it produces accurate results for an unseen set of test data. Other parameters for use in training, as noted above, may include metadata identifying/distinguishing one or more object in the video data, information about the position, pose, and/or type of augmented object included in the video or to be included in the video, audio data or an abstraction thereof (e.g. volume levels, or a voice activity flag). Other parameters will be apparent to the skilled person, such as for example GPS coordinates or descriptive keywords that may be indicative of a scenario and hence predictable behaviour (such as for example at a tennis court).

In some examples, the training of the machine learning algorithm may be performed at e.g. a server. The server may be configured to receive motion data, video data and other optional parameters from a plurality of different display devices 20, and to train the machine learning algorithm in the manner described above. Once the machine learning algorithm has been sufficiently trained, the trained version of the algorithm may be exported to the display device 20. This may be performed, for example, as part of a software update downloaded to the display device, over a communications network.

The machine learning algorithm may employ a neural network such as a 'deep learning' network, or a Bayesian expert system 600, or any suitable scheme operable to learn a correlation between a first set of data points and a second set of data points, such as a genetic algorithm, a decision tree learning algorithm, an associative rule learning scheme, or the like.

Examples of such correlations include the motion of a ball and the motion of the display device; the whole or partial appearance of one or more predetermined classes of real or virtual objects at or adjacent to the periphery of the visibly displayed area, and a motion to centralise them; an audio source correlating with a visible object and motion to centralise them; and the like.

The system 600 shown in FIG. 6 further comprises a scene processor 606 configured to process a portion of the video image captured by the video camera unit 602. As can be seen in FIG. 6, the scene processor 606 receives inputs from the motion predictor 604 and the video camera unit 602, as shown in FIG. 6. The scene processor 606 is configured to identify a portion of the video image that corresponds to an area of the environment that is expected to fall within the user's field of view, as a result of the display device 20 having been moved in the predicted manner.

In the example shown in FIG. 4, this may correspond to detecting that the second portion 402B of the captured video image is likely to fall within the user's view, at a subsequent time. Thus, the scene processor 606 may identify and process this portion of the captured video image. As described previously the video camera unit 602 may comprise two video cameras and the user's view of the environment may correspond to the video image captured by one of the cameras. In this case, the scene processor 606 may be configured to process the image captured by the other camera.

Returning to FIG. 6, the scene processor 606 may be configured to process the lighting conditions present in the identified portion of the captured video image. For example, in some environments, the lighting may vary at different locations within the environment; depending on e.g. how close or far each location is from a light source. The scene processor 606 may be configured to detect the lighting conditions by detecting e.g. an exposure level, a colour temperature, white balance, predominant scene colour, etc. of the identified portion of the video image.

In additional or alternative embodiments, the scene processor 606 may be configured to detect the presence of any physical (i.e. real-life) objects, physical surfaces or boundaries, in the identified portion of the captured video image. In the example of FIG. 4, this may involve detecting the location of the second player within the captured video image, and tracking the location of this player, in subsequent video images received at the scene processor 606.

In some examples, the scene processor 606 may be configured to identify a detected physical object as corresponding to a pre-determined object. In the example of FIG. 4, this may correspond to detecting the presence of the second player 404B in the second portion, and recognising the player as person (and optionally, as a person with an identity known to the system 600). The detection and/or recognition of objects in the captured video image may be achieved via computer vision or machine learning, for example. In other examples, the detection and/or recognition may be achieved via a database accessible to the display device 20. For example, the database may define image features for each of a plurality of different objects, and the objects in the captured image may be recognized based on a comparison with the image features stored in the database.

In preferred examples, the scene processor 606 is also configured to determine a depth (distance) of the physical object(s) that are expected to fall within a user's subsequent view of the environment. For example, the display device 20 may include a depth camera or 3D scanner for capturing depth data of the user's environment. The scene processor 606 may be configured to determine a depth of any physical object that is detected as being present in the identified portion of the captured video image. In the example where two video cameras are used, the depth of the physical objects may be determined via two-view depth estimation, as is known in the art. It will be appreciated that initially such objects may only be visible to one camera, and hence not amenable to two-view depth estimation. In this case, optionally size comparisons to currently known objects in the scene may be used to approximate the distance of the physical object. Similarly, optionally size data relating to physical objects in the scene may be established from image and depth data when available, and then stored for a predetermined period so that if the object is encountered again, its distance can be estimated from its apparent size in a single image. Generally, detecting the depth of the physical objects is useful, since this allows a virtual object to be displayed with an appropriate occlusion (if any).

In some examples, the display device 20 comprises the scene processor 606. In other examples, the scene processor 606 may be implemented at a separate computing device that the display device is in communication with. For example, the scene processor 606 may be executed at e.g. a games console, or at e.g a server that the display device is in communication with via a communications network.

As can be seen in FIG. 6, the scene processor 606 is shown as providing an input to an image generator 608. The input may include data indicating at least one of the detected lighting conditions and the presence of any physical objects, surfaces or boundaries in the area of the environment that a user is expected to look at (be that directly or indirectly depending on the type of display device used).

The image generator 608 is configured to generate a virtual object 502 for display at the display device, in response to receiving the input from the scene processor 606. The image generator 608 is configured to generate a virtual object 502 that takes into account the lighting conditions and any physical objects, surfaces or boundaries that are expected to fall within the user's view, as a result of the user performing the predicted motion with the display device. The image generator 608 is configured to output the generated virtual object 502, in response to a detection of the predicted motion. This ensures that the virtual object 502 is only displayed to the user, at the time at which the detected lighting conditions, physical objects, physical surfaces or boundaries are viewable to the user. In FIG. 6, the image generator 608 is shown as outputting the virtual object 502 for display at the display device 20.

In FIG. 6, the image generator 608 is shown as receiving an additional input in the form of a dashed arrow. This input may correspond to image data received from a separate computing device, such as a games console. For example, the games console may be configured to generate the virtual objects 502 and the image generator 608 may be configured to adjust one or more properties of the virtual objects 502, based on the processing performed by the scene processor 606.

In some examples, the image generator 608 may be separate from the display device 20. For example, both the scene processing and the image generation may be performed at a separate computing device that is in communication with the display device 20. The display device 20 may therefore just display the virtual objects 502 generated at the separate computing device.

A use case of the system 600 of FIG. 6 will now be discussed in relation to FIG. 5.

In FIG. 5, the user's current view of the environment (i.e. viewable at the screen of the user's smartphone) includes the first player 404A and the second player 404B, as well as the basketball hoop 406, and the T-Rex. The T-Rex corresponds to a virtual object 502 generated by the image generator 608.

In FIG. 5, the second player 404B may be calling to the first player, or the first player 404A may generally be travelling in the direction of the second player 404B. In such a case, it may be expected that the user 10 will rotate their smartphone so as to follow the first player 404A or so as to obtain a more central view of the second player 404B. Thus, the motion predictor 604 may predict that the user 10 will perform the corresponding motion, i.e. a rotation, with their smartphone (indicated by the arrow 506). In response to this, the scene processor 606 identifies and processes the part of the scene that is expected to fall within the user's subsequent field of view. As described previously, this may involve processing part of a video image that includes that part of the scene, or processing a video image that contains more of that area of the scene.

The image generator 608 is configured to generate an image of the T-Rex, based on the processing performed by the scene processor 606. This may involve, for example, generating an image of the T-Rex that is exposed to the lighting conditions in the area of the environment that the user is expected to look at. Although not shown, it may be that e.g. the part of the basketball court occupied by the second player 404B is darker or lighter than the part of the basketball court occupied by the first player 404A. In some examples, the image generator 608 may be configured to generate an animation of the T-Rex corresponding to e.g. an interaction with the second player 404B.

It will be appreciated that, whilst the T-Rex shown in FIG. 5 is located towards the right of the displayed image; the image generator 608 may be configured to animate the T-Rex such that it e.g. follows the basketball. In such a case, it may be expected that the T-Rex will be depicted as travelling towards the second player. In such a case, the image generator 608 is configured to adjust the display of the T-Rex, such that it appears with the correct lighting, and respects any physical objects, boundaries or surfaces that will come into the user's view of the environment, as the user's view changes.

Figure 7:
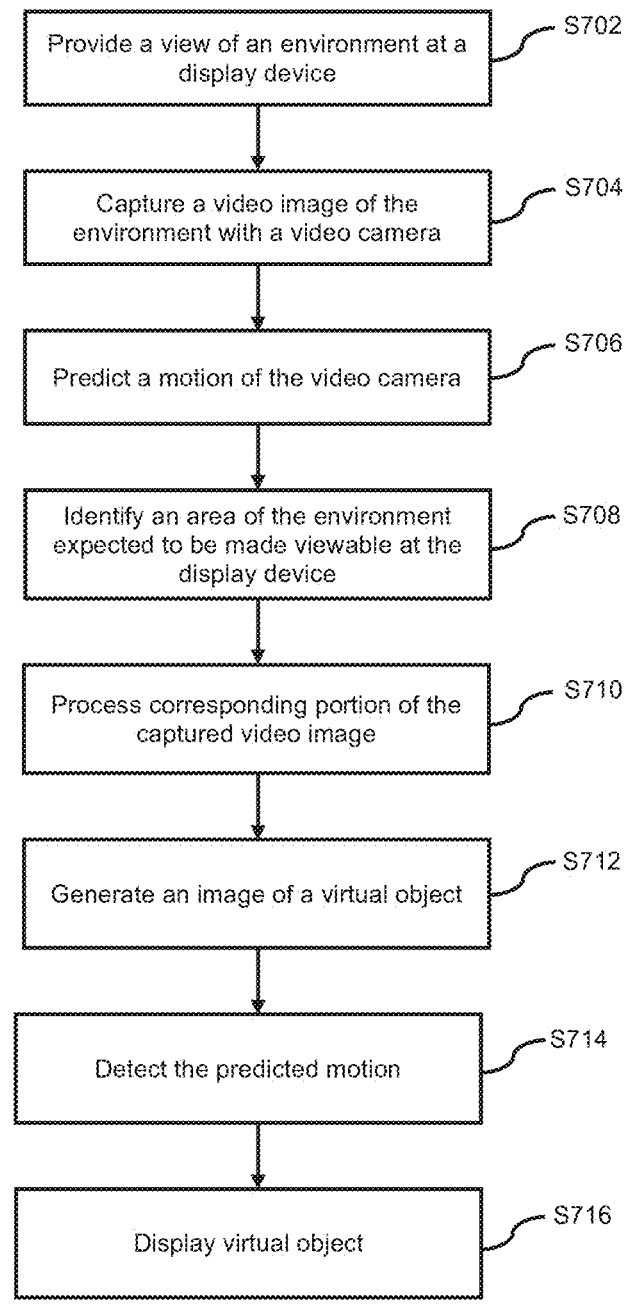
FIG. 7 shows a flow diagram of a method of displaying a virtual object.

FIG. 7 illustrates an example of a method in accordance with the present invention.

At step S702 a view of an environment is provided at a display device. The view may correspond to a real-world view (e.g. augmented reality) or a virtual-world view (e.g. mixed reality). In one example, the environment may be the basketball court described previously in relation to FIGS. 4 and 5.

At step S704, a video image of the environment is captured with a video camera. The area of the environment captured in the video image is larger than the area of the environment viewable at the display device. As described previously, the video camera may form part of the display device itself, or may be separate from (but in communication with) the display device. The video image may be captured by two video cameras, or a single video camera, as described previously.

At step S706, a motion of the video camera is predicted. The motion of the video camera may be predicted based on any of the methods described previously. For example, the motion may be predicted based on at least one of the content of the captured video image, a change in gaze-direction of the user and motion of the display device prior to a current time (e.g. a current trajectory of the video camera). As described previously, machine learning may be used to identify a relationship between video content and subsequent movement of the video camera. In some examples, motion of the video camera may be predicted based on a detected movement of one or more physical objects (including people) in the captured video image.

At step S708, an area of the environment that is expected to be made viewable at the display device, is identified. This area is identified based on the predicted motion of the video camera.

At step 710, a portion of the captured video image corresponding to the portion of the environment that is to be made viewable at the display device, is processed. The processing may include at least one of determining lighting conditions present in the portion of the captured video image and detecting one or more physical objects in the portion of the captured image. The detection of one or more physical objects may involve detecting a relative position and depth of the object(s) in the captured video image. The one or more physical objects may be detected using computer vision or machine learning, for example.

At step S712, an image of a virtual object is generated, based on the processing performed at step S710. The virtual object is generated for display in the view of the environment provided at the display device. As described previously, the virtual object may be generated so as to be exposed to the lighting conditions detected as part of the processing at step S710. In further examples, the virtual object maybe generated based on the one or more detected physical objects. This may involve generating the virtual object so as to have an occlusion that depends on the relative position and depth of the one or more physical objects identified at step S710. This may also involve animating the virtual object so as to interact with the one or more detected physical objects in the environment. The virtual object may be, for example, the T-Rex described previously in relation to FIG. 5.

At step S714, a motion of the video camera corresponding to the predicted motion is detected. In some examples, this need not be a complete match but rather, a motion sufficiently similar to the predicted motion.

At step S716, the generated virtual object is displayed at the display device. The virtual object may be overlaid on top of the view of the environment provided at the display device or may be embedded within a virtual environment that corresponds (at least in part) with the real world environment. The displayed virtual object may correspond to e.g. the T-Rex with appropriate position, depth, interactivity and lighting in the scene, as described previously.

By generating virtual objects in accordance with the embodiments described herein, the display device is able to pre-empt changes in a user's view of the surrounding environment, and to adjust the display of a virtual object accordingly. This allows virtual objects to be depicted as interacting with the environment in real-time because a majority of the processing will already have been performed, prior to that part of the environment coming into the user's view.

Hence an advantage of the present invention is that a characterisation of at least part of the real-world environment for the purposes of augmented reality (such as identifying surfaces, boundaries, objects, lighting conditions and the like) can be performed in anticipation of such augmentation occurring (which typically has a 30 or 60 frame per second rate), by predicting the change in the field of view of the display device and hence predicting what part of the real-world environment may become visible, thereby avoiding a processing bottleneck or peak in which the environment has to be characterised within the first visible frame.

A corresponding advantage is that optionally the system can equally predict what the part of the real-world environment will no—longer be visible, and reduce computational resources accordingly. For example, by dropping characterisation data for that part, or deferring a computation of interactions or augmentations in that part until it is clear whether or not the prediction is correct.

Again similarly, in addition to the pre-characterisation of at least part of the real-world environment predicted to become visible, optionally assets associated with any augmentation corresponding to that part of the environment may also be pre-prepared (for example unpacking relevant textures, or loading relevant shaders, to augment a basketball hoop with flashing lights if it is predicted that the hoop is about to become visible).

The above description has assumed for the most part that the display device 20, such as an HMD or mobile device, features a camera and display as part of the same device, optionally with some or all of the processing performed on a remote device such as a videogame console or server. However, it will be appreciated that the techniques herein can also apply to a telepresence system where a first user controls the or each camera (for example when attending a sporting event), and the view is streamed/broadcast to a remote display device (for example that of a family member, or a subscriber to that stream/broadcast). In this case, the modules 604 and 606 may be located at the camera(s), the display unit or a further remote device such as a videogame console or a server.

It will be appreciated that any of the above configurations may thus act as a system for displaying a virtual object in accordance with the techniques describe herein.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for displaying a virtual object, the system comprising:
    a display device for displaying an environment;
    a video camera; wherein the video camera is operable to capture a video image of an area of the environment of a user, a size of the area of the environment in the captured video image being larger than a size of the area of the environment viewable at the display device;
    a motion predictor operable to predict a motion of the video camera;
    a scene processor operable to identify and process a portion of the captured video image that corresponds to the area of the environment that is expected to be made viewable at the display device, as a result of the predicted motion of the video camera; and
    an image generator configured to receive an input from the scene processor, and in response thereto, generate the virtual object for display at the display device, wherein the image generator is configured to output the virtual object for display in response to a detection of the predicted motion of the video camera, wherein the system comprises two video cameras, the two video cameras being configured to capture images of at least partially different areas of the environment, wherein the area of the environment viewable at the display device is less than the area of the environment captured by the two video cameras, and wherein the scene processor is configured to process video image data for an area outside the area of the environment viewable at the display device.

2. The system according to claim 1, wherein the scene processor is configured to determine lighting conditions in the portion of the captured video image; and wherein the image generator is configured to generate the virtual object as if the virtual object were exposed to the lighting conditions.

3. The system according to claim 1, wherein the scene processor is configured to detect at least one physical object in the portion of the captured video image; and wherein the image generator is configured to generate the virtual object responsive to the at least one physical object.

4. The system according to claim 3, wherein the scene processor is configured to determine a relative position and depth of the at least one physical object; and wherein the image generator is configured to generate the virtual object with an occlusion that depends on the relative position and depth of the at least one physical object.

5. The system according to claim 3, wherein the image generator is configured to generate an animation for the virtual object, the animation corresponding to a virtual interaction between the virtual object and the at least one physical object.

6. The system according to claim 1, wherein the motion predictor comprises a gaze direction detector operable to detect a gaze direction of the user; and wherein the motion predictor is configured to predict a motion of the display device based on detected changes in the user's gaze direction.

7. The system according to claim 1, wherein the system comprises a motion detector operable to detect motion of the display device; and wherein the motion predictor is configured to predict the motion of the display device based on the motion of the display device detected by the motion detector.

8. The system according to claim 1, wherein the motion predictor is configured to detect one or more physical objects in the captured video image; and wherein the motion predictor is configured to predict a motion of the display device based on the one or more physical objects.

9. The system according to claim 8, wherein the motion predictor is configured to detect the one or more physical objects via computer vision or machine learning.

10. The system according to claim 1, wherein the motion predictor is configured to receive motion data indicating motion of the display device and image data indicating content of the captured video image; and wherein the motion predictor comprises a machine learning algorithm, the machine learning algorithm being trained to predict the motion of the display device based on the content of the captured video image.

11. The system according to claim 10, wherein the system comprises a training unit operable to train the machine learning algorithm, the training unit being configured to receive motion data from a plurality of different display devices and video data captured by the plurality of different display devices; and wherein the training unit is configured to determine a relationship between the content of the captured video image and the motion of the display device.

12. A method of displaying a virtual object, the method comprising:

providing a view of an environment at a display device;

capturing a video image of an area of the environment via a video camera, the area of the environment captured in the captured video image being larger than the area of the environment viewable at the display device;

predicting a motion of the video camera;

identifying the area of the environment that is expected to be made viewable at the display device, as a result of the predicted motion of the video camera;

processing a portion of the captured video image that corresponds to the area of the environment that is expected to be made viewable at the display device;

generating an image of the virtual object for display at the display device, the image of the virtual object being generated based on processing of the portion of the captured video image; and displaying the virtual object in response to detecting that the predicted motion of the video camera has been performed, wherein the video camera includes two video cameras, the two video cameras being configured to capture images of at least partially different areas of the environment, wherein the area of the environment viewable at the display device is less than the area of the environment captured by the two video cameras, and wherein processing the portion of the captured video image includes processing video image data for an area outside the area of the environment viewable at the display device.

13. The method according to claim 12, wherein processing the portion of the captured video image comprises at least one of:

i. determining lighting conditions present in the portion of the captured video image; and ii. detecting one or more physical objects in the portion of the captured video image.

14. The method according to claim 12, wherein predicting motion of the display device comprises detecting at least one of:

i. content of the captured video image;

ii. a change in gaze-direction of a user; and iii. a motion of the video camera prior to a current time.

* * * * *